US011168946B2

(12) United States Patent
Ganley

(10) Patent No.: US 11,168,946 B2
(45) Date of Patent: Nov. 9, 2021

(54) HIGH-EFFICIENCY COOLING SYSTEM

(71) Applicant: James T. Ganley, St. Paul, MO (US)

(72) Inventor: James T. Ganley, St. Paul, MO (US)

(73) Assignee: James T. Ganley, St. Paul, MO (US)

( * ) Notice: Subject to any disclaimer, the term of this patent is extended or adjusted under 35 U.S.C. 154(b) by 261 days.

(21) Appl. No.: 16/544,809

(22) Filed: Aug. 19, 2019

(65) Prior Publication Data

US 2021/0055062 A1 Feb. 25, 2021

(51) Int. Cl.
*F28D 20/02* (2006.01)
*F28D 20/00* (2006.01)
*F28D 5/00* (2006.01)

(52) U.S. Cl.
CPC .......... *F28D 20/026* (2013.01); *F28D 5/00* (2013.01); *F28D 20/0034* (2013.01); *F28D 20/028* (2013.01); *F28D 2020/0082* (2013.01)

(58) Field of Classification Search
CPC ..... Y02E 60/14; Y02E 10/10; F28D 20/0052; F28D 20/026; F28D 5/00; F28D 20/0034; F28D 2020/0082
See application file for complete search history.

(56) References Cited

U.S. PATENT DOCUMENTS

| 4,157,730 | A | * | 6/1979 | Despois | F24T 10/20 165/45 |
| 6,298,677 | B1 | * | 10/2001 | Bujak, Jr. | F24F 3/06 62/158 |
| 9,518,787 | B2 | * | 12/2016 | Pilebro | F28D 20/0052 |
| 2010/0281889 | A1 | * | 11/2010 | Reich | F24F 5/0017 62/66 |
| 2010/0307734 | A1 | * | 12/2010 | Wildig | F24T 10/15 165/287 |
| 2016/0195340 | A1 | * | 7/2016 | Bissell | F28D 20/028 165/10 |
| 2018/0195778 | A1 | * | 7/2018 | Crawford | F25B 30/06 |
| 2018/0325147 | A1 | * | 11/2018 | Concin | A23L 3/001 |
| 2019/0360703 | A1 | * | 11/2019 | Franck | F24D 19/1042 |
| 2021/0172685 | A1 | * | 6/2021 | Bergan | F28D 20/028 |

* cited by examiner

*Primary Examiner* — Gordon A Jones

(57) ABSTRACT

A cooling system transfers thermal energy from a temperature-critical reservoir to a heat sink. The system has an intermediate reservoir which is thermally interposed between the temperature-critical reservoir and the heat sink. The intermediate reservoir serves as an energy buffer between the two reservoirs by accepting thermal energy from the temperature-critical reservoir, storing that energy, and then transferring it to a heat sink by means of a temperature-driven process rather than by means of a heat pump. Transfer of thermal energy from the intermediate reservoir to the heat sink is temporally coordinated with naturally occurring temperature variations of the heat sink so that all thermal energy transfer processes conducted by the system are temperature-driven.

4 Claims, 2 Drawing Sheets

HIGH-EFFICIENCY COOLING SYSTEM

BACKGROUND OF THE INVENTION

This invention relates generally to a system which transports thermal energy; more specifically, this invention relates to a system which cools a thermal reservoir by transporting a portion of its thermal energy to a heat sink without using a heat pump.

If a thermally conducting path is maintained between two thermal reservoirs, thermal energy will pass from the reservoir which has a higher temperature to the reservoir which has a lower temperature. The transfer process occurs spontaneously; that is, the process occurs without the driving influence of work done by an external system. The term "temperature-driven" is used herein to refer to a thermal energy transfer process that results from the temperature difference between two reservoirs.

The reverse of the process discussed in the previous paragraph is never observed. Thermal energy is never observed to pass spontaneously from a lower to a higher temperature reservoir. This fact is the basis for the second law of thermodynamics, formalized in 1850 by Rudolph Clausius: "Heat (thermal energy) will not pass from a colder body to a warmer body without some other change, connected therewith, occurring at the same time." The phrase "other change" used in the Clausius statement refers to work that must be done by an external system. Unless some form of external work is done, the transfer of thermal energy from a lower to a higher temperature reservoir cannot occur. The term "work-driven" is used herein to refer to a thermal energy transfer process that is opposed by the temperature difference between two reservoirs, and therefore must be forced by an external system which does work. The term "external system" is used herein to refer to a system that has no component or elemental part in common with either of the two reservoirs exchanging energy. The word "work" is used herein to refer to the transfer of energy through the action of macroscopic forces. The term "external work" is used herein to refer to work done by an external system.

Modern cooling systems force the transfer of thermal energy from a lower to a higher temperature reservoir by making use of an external system which does work on a working fluid. The apparatus which performs the work is generally referred to as a heat pump. The most common type of heat pump currently in use today is the vapor-compression heat pump, which accepts energy—usually electrical energy—from an external source and uses that energy to force the cyclical compression and expansion of a working fluid. The working fluid accepts thermal energy from a reservoir which must be cooled and then rejects that energy to a separate reservoir, called a heat sink, which is generally at a higher temperature than the reservoir being cooled.

Work done by a heat pump enables an air conditioner to transfer thermal energy from the interior of a building to the warmer atmosphere outside of the building. Similarly, work done by a heat pump enables the transfer of thermal energy from the interior of a refrigerator to the warmer air outside of the refrigerator. In both of these examples, and in many other examples that could be listed, work is done by an external system in order to accomplish the transfer of thermal energy from a lower to a higher temperature reservoir. These are examples of work-driven thermal energy transfer processes. They are much less efficient than temperature-driven processes.

The electrical energy used by heat pumps in work-driven cooling applications is a large and growing percentage of global electricity consumption, accounting for roughly 20 percent of total electricity usage in most industrially developed countries. Electricity is the most versatile and the most generally useful form of energy consumed by modern industrial societies. It is problematic that so much of this valuable form of energy is consumed in cooling applications—applications that are nothing more than low-grade thermal energy transfer processes. The present specification addresses this problem by revealing a system which cools a thermal reservoir without using work-driven processes, using instead only highly efficient temperature-driven processes. Large scale deployment of systems of the type revealed herein would (1) greatly diminish the expense associated with most cooling operations and (2) significantly reduce requirements for electricity generation in many countries.

BRIEF DESCRIPTION OF THE INVENTION

The current technology for cooling of temperature-critical reservoirs (residential, retail, and industrial structures; refrigerators; freezers; cooled process equipment; etc.) is based primarily on electrically driven heat pumps. Heat pumps do the work required to force the transfer of thermal energy from a lower to a higher temperature reservoir. These work-driven processes are relatively inefficient, with values for the coefficient of performance (COP) typically in the range of 2.0 to 4.0. COP is a figure of merit related to the efficiency of a cooling or heating process. In this specification, COP is defined as the ratio of the quantity of thermal energy transferred during a cooling process to the quantity of energy consumed by an external device involved in the energy transfer process. For a work-driven process, a relatively large amount of energy is consumed by a heat pump that does work on a working fluid. For a temperature-driven process, a much smaller amount of energy is consumed by a mechanical pump that just drives coolant around a flow loop.

The object of this invention is to provide a system which cools temperature-critical reservoirs by using only temperature-driven thermal energy transfer processes.

A novel feature of the presently revealed system is an intermediate reservoir which serves as a thermal energy buffer (temporary thermal energy storage reservoir) between a temperature-critical reservoir, whose temperature is to be held within some pre-determined range, and a heat sink, whose temperature may vary with time over a broad range. Before the present system can be used in cooling applications, the intermediate reservoir must be cooled by transferring some of its thermal energy to a heat sink. This transfer is coordinated with naturally occurring temperature variations of the heat sink. The coordination involves operating the flow loop which transfers thermal energy between the intermediate reservoir and the heat sink only when the temperature of the heat sink is below the temperature of the intermediate reservoir. This assures efficient temperature-driven energy transfer between the two reservoirs. When the temperature difference between the two reservoirs is reversed or greatly reduced because of naturally occurring temperature variations of the heat sink, operation of the flow loop linking the two reservoirs is suspended. By utilizing this temporally coordinated, temperature-driven cooling operation, the intermediate reservoir can be brought to, and maintained at, a temperature below the lowest temperature desired for any part of the temperature-critical reservoir. The pre-cooled intermediate reservoir can thereby receive thermal energy from the temperature-critical reservoir by means of a temperature-driven process. The presence of an intermediate reservoir allows the present system to perform temperature-driven cooling operations even when the temperature of the heat sink is higher than the temperature desired for the temperature-critical reservoir.

The presently revealed system can function effectively in performing temperature-driven cooling operations only if the intermediate reservoir has a heat capacity that is large relative to the cooling requirements of the temperature-critical reservoir. Also, the intermediate reservoir must have relatively small naturally occurring temperature variations. When these two conditions are met, the temperature of the intermediate reservoir will remain fairly constant once it has been pre-cooled by the temperature-driven process described in the previous paragraph, changing noticeably only when thermal energy is added or removed by the present system when it is performing a cooling operation. When the present system is transferring thermal energy from a temperature-critical reservoir to the intermediate reservoir, the temperature of the intermediate reservoir tends to increase slowly. However, that increase is balanced over time as the present system removes thermal energy from the intermediate reservoir and transfers it to a heat sink. It is noted that cooling of a region within the temperature-critical reservoir may be required at any time, but the transfer of thermal energy from the intermediate reservoir to the heat sink occurs only when the temperature of the heat sink is less than the temperature of the intermediate reservoir. At times, the two operations are conducted simultaneously. At other times, the two operations are conducted singly.

When cooling of a temperature-critical reservoir is required, the pre-cooled intermediate reservoir can accept thermal energy from a temperature-critical reservoir by means of a temperature-driven process. The presence of the intermediate reservoir thereby enables a two-step process for transferring thermal energy from a temperature-critical reservoir to a final heat sink, with both steps using a highly efficient temperature-driven thermal energy transfer process. The temperature of the intermediate reservoir is always maintained at a low value, even though the temperature of the final heat sink may vary over a broad range, a range that may include temperatures well above the desired temperature of the temperature-critical reservoir.

The crucial factor for properly utilizing the presently revealed system's intermediate reservoir is timing. The intermediate reservoir is maintained at a low temperature by transferring its thermal energy to a heat sink only at times when the temperature of the heat sink is well below the temperature of the intermediate reservoir.

A preferred embodiment of the present invention involves using the atmosphere as a heat sink and a volume of subterranean earth as the intermediate reservoir, with the earth penetrated by the boreholes of a borehole heat exchanger. In this embodiment, during the winter, thermal energy is transferred from the (subterranean) intermediate reservoir to the colder gases of the atmosphere through a temperature-driven process, thereby lowering the overall temperature of the earth around the boreholes to a value below the lowest temperature required for the temperature-critical reservoir. This ensures that, when cooling is needed, thermal energy can be transferred from the temperature-critical reservoir to the intermediate reservoir by a high-efficiency temperature-driven thermal energy transfer process.

Borehole heat exchangers have been used for many years in solar heating applications and their characteristics are well-known. Using data obtained from heating systems with borehole heat exchangers, it is estimated that the (cooling) COP of the present system will be above 30, or roughly ten times the COP of conventional cooling systems that rely on work-driven thermal energy transfer processes. (The COP of the present system is defined as the ratio of the thermal energy transferred during a cooling operation to the work done by a mechanical pump in driving coolant around a flow loop. The present system does no work on a working fluid.) The system revealed in this specification could decrease the cost of electricity for most cooling applications to less than 10 percent of the cost of electricity for conventional cooling systems that use heat pumps to force the transfer of thermal energy against a temperature difference.

DETAILED DESCRIPTION OF THE INVENTION

Figure 1:
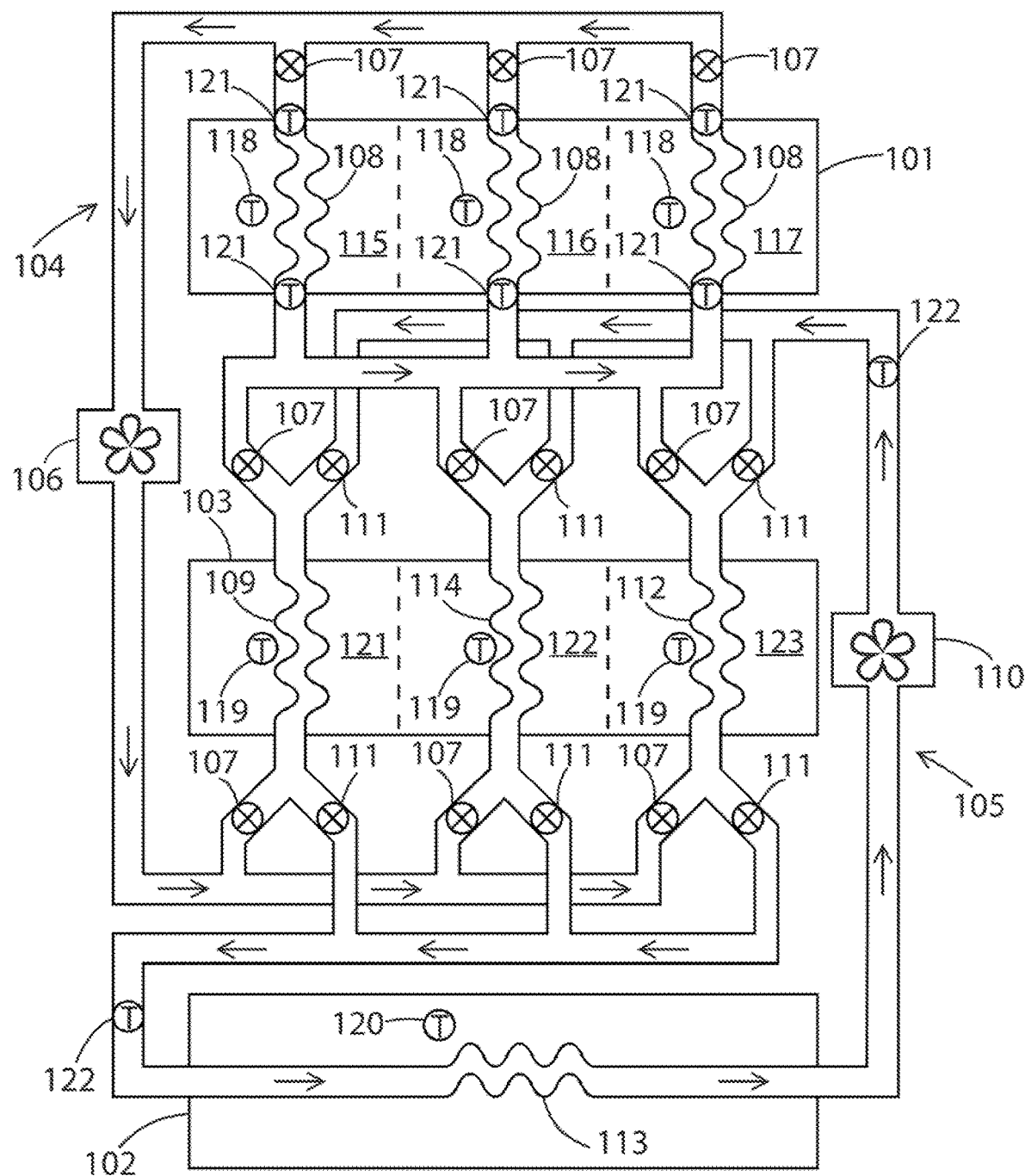
FIG. 1 is a schematic diagram of the presently revealed system which shows an intermediate reservoir interposed between a temperature-critical reservoir and a heat sink.

This specification uses terms which have a technical meaning that may differ from the meaning assumed in everyday usage. The following paragraphs contain definitions and explanations of various terms and concepts with regard to the meaning intended herein.

The term "thermal energy" is used herein to refer to the kinetic energy associated with the rotations, vibrations, and random translational velocities of atoms and molecules. For the purposes of this specification, the thermal energy associated with a mass of material is the same as its internal energy. Other forms of internal energy (nuclear, chemical, electrical, gravitational, etc.) are not are not considered in this specification.

The word "heat" is used herein to designate the transfer of thermal energy through the microscopic interactions (collisions) of atoms, molecule, and in some materials, electrons. Heat is thermal energy in transit from a higher to a lower temperature mass of material.

The word "work" is used herein to designate the transfer of energy through the action of macroscopic forces. In this specification, two types of work are considered. The term "thermodynamic work" is used herein to refer to the action of macroscopic forces in changing the thermodynamic state variables (pressure, temperature, specific volume, internal energy, etc.) of a fluid. The term "mechanical work" is used herein to refer to the action of macroscopic forces in driving the flow of fluid through a conduit. The term "working fluid" is used herein to refer to a fluid which transfers thermal energy as a result of processes that do thermodynamic work on the fluid.

The word "reservoir" and the term "thermal reservoir" are used interchangeably herein to refer to a mass of material (material body) which may be a solid, a liquid, a gas, or some combination thereof, with the mass of material being characterized by its temperature and the quantity of thermal energy it possesses. The temperature of a reservoir may change over time as it accepts thermal energy from, or transfers thermal energy to, other reservoirs.

The reservoirs discussed in this specification are not necessarily in a state of thermodynamic equilibrium. In particular, different regions within a reservoir could be at different temperatures. For instance, a residential structure is an example of a thermal reservoir, but different rooms within the structure, or different locations within a single room, could be at different temperatures. In this specification, reference to the temperature of a reservoir does not imply that the reservoir is at thermal equilibrium or that it can be characterized by a single temperature. Rather, the temperature of a reservoir refers to the temperature at some specific location within the reservoir or to a rough average of the temperatures at different locations within the reservoir. The word "temperature" and the term "overall temperature" are synonymous in the latter respect.

The term "temperature-critical reservoir" is used herein to refer to a reservoir whose temperature is to be brought to, and held within, some particular temperature range through the implementation of a cooling process. Examples of temperature-critical reservoirs would include residential, retail, or industrial structures, as well as refrigerators, freezers, industrial cooling units, etc. On a larger scale, examples of temperature-critical reservoirs would include an entire residential neighborhood or an industrial park or a large assembly of industrial cooling equipment, or combinations thereof. The invention revealed in this specification uses temperature-driven thermal energy transfer processes to provide cooling for temperature-critical reservoirs of any size or complexity.

The term "heat sink" is used herein to refer to the thermal reservoir which ultimately accepts the thermal energy removed from a temperature-critical reservoir during a cooling operation. Examples of heat sinks would include the atmosphere or a large body of water. The cooling system revealed in this specification conducts cooling operations by first removing thermal energy from a temperature-critical reservoir and then transferring that energy to a heat sink. However, the present system does not conduct the energy transfer directly. Instead, the thermal energy is transferred from a temperature-critical reservoir to a reservoir which temporarily stores the energy until it can be passed along to a heat sink by means of a temperature-driven process. The term "intermediate reservoir" is used herein to designate a reservoir which is thermally linked—by independent links—to (1) a temperature-critical reservoir and to (2) a heat sink, with the linkage being such that the intermediate reservoir can accept thermal energy from a temperature-critical reservoir, store that energy, and then transfer it to a heat sink by means of a temperature-driven process. The term "thermally linked" is used herein to refer to two reservoirs that are connected by a flow loop (defined later) which carries thermal energy from one reservoir to the other by means of the mass flow of a fluid. Thus, the term "thermal link," as used herein, designates a flow loop which carries thermal energy from one reservoir to another by means of mass flow of a fluid.

From time to time, naturally occurring temperature variations of the heat sink may make it impossible to directly transfer thermal energy from a temperature-critical reservoir to a heat sink by a temperature-driven process. For example, in the summer, the temperature of the atmosphere is usually above the temperature desired for the interior of a residential structure, thus negating the possibility of a temperature-driven cooling operation. When this type of situation exists, the present system's intermediate reservoir can store the thermal energy removed from the temperature-critical reservoir for a period of time, releasing that energy only during time intervals when the temperature of the heat sink is below the temperature of the intermediate reservoir. This allows thermal energy to be transferred from the temperature-critical reservoir to the heat sink by means of two independent temperature-driven processes, even though the temperature of the heat sink may at times be above the temperature desired for the temperature-critical reservoir.

The intermediate reservoir may take any one of several forms, such as a body of water or a volume of earth; but its function is always the same: to serve as a thermal energy buffer (temporary thermal energy storage reservoir) between the temperature-critical reservoir and the heat sink. With the intermediate reservoir disposed in this manner, the present system has the ability to transfer thermal energy from a temperature-critical reservoir to a heat sink in two steps. The first step involves the transfer of thermal energy from a temperature-critical reservoir to the intermediate reservoir. The second step involves the transfer of thermal energy from the intermediate reservoir to a heat sink. The presence of the intermediate reservoir makes it possible to conduct both steps as spontaneous, highly efficient temperature-driven processes, regardless of temperature variations of the heat sink.

In this specification, two reservoirs are said to be in "thermal contact" if they can spontaneously exchange thermal energy, either because they are in direct physical contact or because they are joined by a thermally conducting path. The term "heat exchanger" is used herein to designate a passive device which facilitates the transfer of thermal energy from a higher to a lower temperature reservoir by providing a thermally conducting path between the two reservoirs. The heat exchangers in the presently revealed system are comprised of a length of closed conduit whose walls provide a thermally conducting path for transferring thermal energy between a thermal reservoir which is outside the conduit walls and a fluid (a moving thermal reservoir) which flows inside the conduit walls.

The term "flow loop" is used herein to refer to a continuous, closed passage formed by sections of conduit which physically join and flow-wise connect a mechanical pump, a multiplicity of valves, and two or more heat exchangers. The term "flow-wise connected" is used herein to refer to a physical interconnection of elements which allows a fluid (coolant) to flow through the connected elements. The term "coolant" is used herein to refer to a moving thermal reservoir (a mass of fluid) which transports thermal energy through a flow loop by means of mass flow. The term "mechanical pump" is used herein to refer to a device which does mechanical work in forcing the circulation of coolant around a flow loop. The term "valve" is used herein to refer to an inline device which may be opened or closed at different times, thereby allowing or blocking the flow of coolant so as to regulate, direct, and guide the flow of coolant as it passes around a flow loop. The present system's flow loops are the means by which thermal energy is transported from one thermal reservoir to another. Valves, which are components of a flow loop, direct the flow of coolant to various locations within the reservoirs that are involved in exchanging energy. Within the confines of a flow loop, thermal energy is transferred to or from a mass of coolant as it passes through a heat exchanger.

The temperature of any particular mass of coolant changes as the mass circulates around a flow loop. The temperature rises as the mass of coolant absorbs thermal energy from a warmer reservoir; the temperature falls as the mass rejects thermal energy to a cooler reservoir. The sequential process of absorbing and then rejecting thermal energy is the method by which flowing coolant transfers thermal energy from one thermal reservoir to another. It is noted that, in the present system, coolant is not a thermodynamic working fluid because its thermodynamic state variables do not change as the result of the macroscopic forces driving its flow. The mechanical pumps driving the flow of coolant around the present system's flow loops perform mechanical work, not thermodynamic work.

The present system has two flow loops: a primary flow loop and a secondary flow loop. The primary flow loop provides a thermal link between a temperature-critical reservoir and the intermediate reservoir. The secondary flow loop provides a thermal link between the intermediate reservoir and a heat sink. Primary loop coolant circulates through the primary flow loop; secondary loop coolant circulates through the secondary flow loop. The bodies of primary and secondary loop coolant are flow-wise isolated, which means that they are never allowed to mix. Operation of the primary flow loop (by activation of the primary flow loop's mechanical pump) transfers thermal energy from a temperature-critical reservoir to the intermediate reservoir. The valves that control, direct, and guide the flow of primary loop coolant are referred to herein as "primary loop valves." Primary loop valves conduct primary loop coolant when they are open. They can be opened and closed in different combinations so as to change the geometrical configuration of the primary flow loop. This reconfiguring can be done so as to allow primary loop coolant to accept thermal energy from selected regions of the temperature-critical reservoir and then reject that thermal energy to selected regions of the intermediate reservoir. Operation of the secondary flow loop (by activation of the secondary flow loop's mechanical pump) transfers thermal energy from the intermediate reservoir to a heat sink. The valves that control, direct, and guide the flow of secondary loop coolant are referred to herein as "secondary loop valves." Secondary loop valves conduct secondary loop coolant when they are open. They can be opened and closed in different combinations so as to change the geometrical configuration of the secondary flow loop, thereby allowing secondary loop coolant to accept thermal energy from selected regions of the intermediate reservoir and then reject that energy to the heat sink.

There are two functional types of heat exchangers in the presently revealed cooling system: (1) heat-accepting heat exchangers that accept thermal energy from a reservoir outside of the conduit walls and transfer that thermal energy to coolant flowing inside the conduit walls and (2) heat-rejecting heat exchangers that transfer thermal energy from coolant flowing inside the conduit walls to a reservoir outside of the conduit walls. Since the heat exchangers discussed in this specification are passive devices, the transfer of thermal energy through their walls is always a spontaneous, temperature-driven process. Operation of the present system must be conducted so that the desired direction of thermal energy flow is favored by the temperature differences maintained between the temperature-critical reservoir and the intermediate reservoir, and between the intermediate reservoir and the heat sink.

The heat exchangers fixed in direct thermal contact with a temperature-critical reservoir are referred to herein as "primary loop heat-accepting heat exchangers". Their function is to cool different regions of the temperature-critical reservoir by facilitating the transfer of thermal energy from those regions to primary loop coolant flowing through the conduit comprising the primary loop heat-accepting heat exchanger. It is noted that the temperature-critical reservoir may have several separate regions which have different cooling requirements. In this situation, each region would, of necessity, be serviced by its own individual primary loop heat-accepting heat exchanger. Valves connected in series with the individual primary loop heat-accepting heat exchangers can be opened or closed in order allow or block primary loop coolant flow through any primary loop heat accepting heat exchanger, depending on whether or not cooling is required for the region of the temperature-critical reservoir which is in thermal contact with that particular primary loop heat-accepting heat exchanger.

Primary loop coolant carries (by mass flow) thermal energy that has been removed from various regions within the temperature-critical reservoir to another primary loop heat exchanger, which is referred to herein as the "primary loop heat-rejecting heat exchanger." The primary loop heat-rejecting heat exchanger is an intermediate-reservoir heat exchanger in that it is disposed so as to be in thermal contact with the intermediate reservoir. Its function is to facilitate the transfer of thermal energy from the primary loop coolant to the intermediate reservoir. It is seen from the preceding discussion that the overall function of the primary flow loop is to cool a temperature-critical reservoir by transferring some of its thermal energy to the intermediate reservoir. This is the first step of the two-step process revealed herein for cooling a temperature-critical reservoir by means of temperature-driven processes. It is noted that this first step (temperature-driven thermal energy transfer from the temperature-critical reservoir to the intermediate reservoir) is possible only if the temperature of the intermediate reservoir at the location of the primary loop heat-rejecting heat exchanger is maintained at a temperature below the temperatures desired for regions within the temperature-critical reservoir.

Another of the present system's intermediate-reservoir heat exchangers is referred to herein as the "secondary loop heat-accepting heat exchanger." This heat exchanger is a component of the secondary flow loop and, like other intermediate-reservoir heat exchangers, it is disposed so as to be in thermal contact with the intermediate reservoir. Its function is to facilitate the transfer of thermal energy from the intermediate reservoir to secondary loop coolant flowing through the conduit that comprises the secondary loop heat-accepting heat exchanger. The secondary loop coolant carries thermal energy (by mass flow) from the intermediate reservoir to the other secondary loop heat exchanger, referred to herein as the "secondary loop heat-rejecting heat exchanger."

The secondary loop heat-rejecting heat exchanger is a component of the secondary flow loop and it is disposed so as to be in thermal contact with a heat sink. Its function is to facilitate the transfer of thermal energy from the secondary loop coolant to the heat sink. It is seen from the preceding discussion that the overall function of the secondary flow loop is to transfer thermal energy from the intermediate reservoir to the heat sink. This is the second step of the two-step process revealed herein for cooling a temperature-critical reservoir by temperature-driven processes. It is noted that this second step (temperature-driven thermal energy transfer from the intermediate reservoir to the heat sink) is possible only if the temperature of the heat sink at the location of the secondary loop heat-rejecting heat exchanger is less than the temperature of the intermediate reservoir at the location of the secondary loop heat-accepting heat exchanger. A control system, which will be discussed later, allows the secondary flow loop to operate only when this condition exists. This ensures efficient, temperature-driven transfer of thermal energy between the intermediate reservoir and the heat sink.

From this discussion it can be seen that two different processes occur within the intermediate reservoir. One process is that the intermediate reservoir accepts thermal energy into a region that has previously been cooled by passing thermal energy along to a heat sink. The other process is that the intermediate reservoir rejects thermal energy from a region that has previously been warmed by accepting thermal energy from a temperature-critical reservoir. These two processes must occur at the same location within the intermediate reservoir, and therefore they cannot occur at the same time (without significant and unnecessary duplication of hardware). This problem is solved by having a multiplicity of intermediate-reservoir heat exchangers disposed at various locations within the intermediate reservoir. Each intermediate-reservoir heat exchanger must at times serve as a primary loop heat-rejecting heat exchanger, and at other times serve as a secondary loop heat-accepting heat exchanger. Therefore, each of the intermediate reservoir heat exchangers must be connected to valves which can be opened or closed so as to flow-wise connect with either the primary or the secondary flow loop. At any given time, only two of the intermediate-reservoir heat exchangers will be active; the others will be flow-wise isolated (by closed valves) from both the primary and secondary flow loops. The flow-wise isolated intermediate-reservoir heat exchangers are called "dormant heat exchangers." For example, if an intermediate-reservoir heat exchanger has cooled a region of the intermediate reservoir to a low temperature while it was connected to the secondary flow loop, that heat exchanger can then be isolated from the secondary flow loop (by closing associated secondary loop valves) and a different intermediate-reservoir heat exchanger can then be connected into the secondary flow loop so as to cool a different region of the intermediate reservoir. The intermediate-reservoir heat exchanger which has cooled the region of the intermediate reservoir remains dormant until it is needed for accepting thermal energy from the temperature-critical reservoir. Then its primary loop valves are opened and it becomes an active component of the primary flow loop.

Regarding the transfer of thermal energy to and from the intermediate reservoir, it is noted that the temperature profile of the intermediate reservoir changes during operation of the present system. Changes in the temperature profile require that the physical location of the active heat exchangers operating within the intermediate reservoir be changed also. Changing the location of the active primary loop heat-rejecting heat exchanger and the secondary loop heat-accepting heat exchanger is accomplished by opening or closing primary and secondary loop valves that are connected in a wye configuration to the coolant intake ports and the coolant discharge ports of the intermediate-reservoir heat exchangers. This maintains system performance at a high level. The active primary loop heat-rejecting heat exchanger and the active secondary loop heat-accepting heat exchanger are always at different locations within the intermediate reservoir.

The term "borehole heat exchanger" is used herein to refer to an array of holes bored into the earth, with a U-shaped conduit inserted into each hole. The holes are typically backfilled with grout or other thermally conducting material so as to establish a thermally conducting path between the U-shaped conduits and the earth around the boreholes. The individual U-shaped conduits within the boreholes are usually connected in a series/parallel flow arrangement and a set of valves is installed in the connecting lines. The valves can be used to divide a borehole array into a multiplicity of separate intermediate-reservoir heat exchanges. At any given time, one of these heat exchangers serves as the primary loop heat-rejecting heat exchanger, and one serves as the secondary loop heat-accepting heat exchanger. The other intermediate-reservoir heat exchangers are flow-wise isolated from both the primary and secondary flow loops. Selection of which intermediate-reservoir heat exchangers are active and which are dormant is made by opening and closing valves that control the flow of coolant through the various borehole heat exchangers. It is noted that a borehole heat exchanger may be comprised of several boreholes with interconnected U-shaped conduits.

The earth around the boreholes can serve as an effective intermediate reservoir because of its large heat capacity and immunity to seasonal variations in temperature. In the preferred embodiment of the present invention, a borehole array, is divided into multiple borehole heat exchangers, with one of the borehole heat exchangers being flow-wise connected to the primary flow loop so as to serve as a primary loop heat-rejecting heat exchanger when needed to cool a region or regions of the temperature-critical reservoir, and with one of the borehole heat exchangers being flow-wise connected to the secondary flow loop so as to serve as the secondary loop heat-accepting heat exchanger whenever the temperature of the heat sink is below the temperature of the intermediate-reservoir region around the secondary loop heat accepting heat exchanger. The remaining borehole heat exchangers are dormant. As the temperature profile of the earth around the borehole array changes, the valves that are connected to the various borehole heat exchangers may be opened or closed so as to change the location of the regions where thermal energy is deposited or removed. Thus, a borehole heat exchanger can serve as a very efficient and versatile heat exchanger and the earth around the boreholes can serve as an effective intermediate reservoir.

It is clear from the preceding discussion that temperatures within the various reservoirs must be measured and the results of the temperature measurements must be used to control the operation of flow loop hardware (valves and pumps).

The present system includes a multiplicity of temperature sensors, with the individual sensors deployed at various locations within the temperature-critical reservoir, the intermediate reservoir, the heat sink, and the primary and secondary flow loops. The present system also includes a control system which responds to signals from the temperature sensors by activating the system's pumps and by opening or closing valves in such a way that a temperature-driven process is used to maintain the temperature of the system's intermediate reservoir at a level below the lowest temperatures desired for the temperature-critical reservoir. When this condition exists, the present system can efficiently cool a temperature-critical reservoir by means of a temperature-driven process that transfers thermal energy from regions of the temperature-critical reservoir to a cooler region of the intermediate reservoir.

The following points are emphasized regarding the hardware of the present system. First, the primary loop heat-accepting heat exchangers, are in thermal contact with the temperature-critical reservoir. Each primary loop heat-accepting heat exchanger is capable of accepting thermal energy from a specific region of the temperature-critical reservoir. A valve in series with each primary loop heat-accepting heat exchanger may be opened when cooling is required for the surrounding region, or closed when the surrounding region is as cool as desired. Second, there are several intermediate-reservoir heat exchangers in thermal contact with the intermediate reservoir. Each intermediate-reservoir heat exchanger has a primary loop valve and a secondary loop valve connected in a wye configuration at each of its ends. Opening the two primary loop valves (and closing the two secondary loop valves) connects an intermediate-reservoir heat exchanger into the primary flow loop and the heat exchanger becomes the primary loop heat-rejecting heat exchanger. Opening the two secondary loop valves (and closing the two primary loop valves) connects the intermediate-reservoir heat exchanger into the secondary flow loop and it becomes the secondary loop heat-accepting heat exchanger. Each intermediate-reservoir heat exchanger will sometimes serve as the primary loop heat-rejecting heat exchanger and each will sometimes serve as the secondary loop heat-accepting heat exchanger, depending on the (temperature) status of the regions around the various heat exchangers. At any given time, there is one active primary loop heat-rejecting heat exchanger and one active secondary loop heat-accepting heat exchanger. The remaining intermediate-reservoir heat exchangers are dormant until they are needed as active components of the primary flow loop for cooling the temperature-critical reservoir or as active components of the secondary flow loop for transferring thermal energy to the heat sink.

FIG. 1 is a schematic diagram of the cooling system revealed in this specification. The system is thermally linked to temperature-critical reservoir 101 and heat sink 102. Temperature-critical reservoir 101 and heat sink 102 are not considered to be part of the presently revealed cooling system; they are reservoirs that exchange thermal energy with the present system during cooling operations.

Operation of the present system is intended to cool temperature-critical reservoir 101 by transferring some of its thermal energy to heat sink 102. Intermediate reservoir 103 allows this energy transfer process to take place in two steps, with one of the steps carried out by operating primary flow loop 104, and with the other step carried out by operating secondary flow loop 105. When the system is properly operated, both steps involve highly efficient temperature-driven thermal energy transfer processes.

Primary flow loop 104 includes and flow-wise links primary loop pump 106, primary loop valves 107, primary loop heat-accepting heat exchangers 108, and primary loop heat-rejecting heat exchanger 109. Secondary flow loop 105 includes and flow-wise links secondary loop pump 110, secondary loop valves 111, secondary loop heat-accepting heat exchanger 112, and secondary loop heat-rejecting heat exchanger 113. FIG. 1 also shows intermediate-reservoir heat exchanger 114 which is dormant; that is, it is not connected to either the primary or secondary flow loops because both the primary loop valves 107 and the secondary loop valves 111 at its ends are closed.

FIG. 1 shows a typical temperature-critical reservoir 101 which is being cooled by the present system. Temperature-critical reservoir 101 as shown in the figure has three separate regions 115, 116, and 117, with the separation of the individual regions shown by dashed lines. Each of the regions is cooled by one of the present system's primary loop heat-accepting heat exchangers 108. The temperatures of regions 115, 116, and 117 are monitored by dedicated temperature sensors 118. Signals generated by temperature sensors 118 are sent to the present system's control system (not shown) which operates primary loop pump 106 and opens or closes primary loop valves 107 that are in series with primary loop heat-accepting heat exchangers 108, thereby providing cooling for any regions (115, 116, 117) that have a temperature above what is desired. FIG. 1 also shows the present system's intermediate reservoir 103 as being comprised of three separate regions 121, 122, and 123. Again, the separation of the individual regions is shown by dashed lines. Each of the regions is shown as being in intimate thermal contact with one intermediate-reservoir heat exchanger. The temperatures of regions 121, 122, and 123 are monitored by a dedicated intermediate-reservoir temperature sensors 119. The control system uses these temperature sensor signals to open and close primary and secondary loop valves which are connected in a wye-configuration with the intermediate-reservoir heat exchangers. FIG. 1 shows a situation where the valves are disposed so as to create a primary loop heat-rejecting heat exchanger 109 (wye-connected primary loop valves 107 open and wye-connected secondary loop valves 111 closed), a dormant heat exchanger 114 (wye-connected primary loop valves 107 and wye-connected secondary loop valves 111 closed), and a secondary loop heat-accepting heat exchanger 112 (wye-connected primary loop valves 107 closed and wye-connected secondary loop valves 111 closed). FIG. 1 shows secondary loop heat-rejecting heat exchanger 113 in thermal contact with the heat sink 102. Heat-sink temperature sensor 120 measures the temperature of heat sink 102 at a location near secondary loop heat-rejecting heat exchanger 113. Temperature sensors 121 and 122 measure temperatures of the primary and secondary loop coolant, respectively, at critical locations within primary flow loop 104 and secondary flow loop 105. These coolant temperature measurements provide diagnostic information that is used to assess the performance of the various heat exchangers and other system components.

Activating primary loop pump 106 drives primary loop coolant around primary flow loop 104, thereby transferring thermal energy from temperature-critical reservoir 101 to intermediate reservoir 103. Individual primary loop valves 107 are opened or closed so as to direct primary loop coolant through specific primary loop heat-accepting heat exchangers 108, thereby allowing primary loop coolant to accept thermal energy from specific regions of temperature-critical reservoir 101. Also, opening a pair of primary loop valves 107 located at opposite ends of one of the intermediate-reservoir heat exchangers allows primary loop coolant to be directed through one of the multiplicity of intermediate-reservoir heat exchangers. This heat exchanger, which is selectable by choosing which pair of primary loop valves to open, then becomes primary loop heat-rejecting heat exchanger 109.

Activating secondary loop pump 110 drives secondary loop coolant around secondary flow loop 105, thereby transferring thermal energy from intermediate reservoir 103 to heat sink 102. Individual secondary loop valves 111 are opened or closed in order to select one specific heat exchanger as the secondary loop heat-accepting-heat exchanger 112. Secondary flow loop 105 is only operated when the temperature of intermediate reservoir 103 at the location of the selected secondary loop heat-accepting heat exchanger is greater than the temperature of heat sink 102. This ensures that the energy is transferred from the intermediate reservoir to the heat sink by a temperature-driven process. It is noted that there is only one heat exchanger in thermal contact with the heat sink.

It is noted that, before the present system can be used in cooling operations, some regions of the intermediate reservoir 103 must be pre-cooled to a temperature below the lowest temperature desired for any region of temperature-critical reservoir 101. Like all other transfers of thermal energy from intermediate reservoir 103 to heat sink 102, the pre-cooling operations are accomplished by operating secondary flow loop 105 only when the naturally occurring temperature variations of heat sink 102 cause it to be at a lower temperature than one or more regions of intermediate reservoir 103. After one or more regions of intermediate reservoir 103 have been pre-cooled, temperature-critical reservoir 101 can be cooled by operating primary flow loop 104 whenever cooling operations are necessary. (Secondary flow loop 105 is operated only when the temperature of heat sink 102 is below the temperature of one or more regions of intermediate reservoir 103.) On average, intermediate reservoir 103 is maintained at a relatively low temperature by balancing, over time, the input of thermal energy from primary flow loop 104 with the removal of thermal energy by the secondary flow loop 105.

Figure 2:
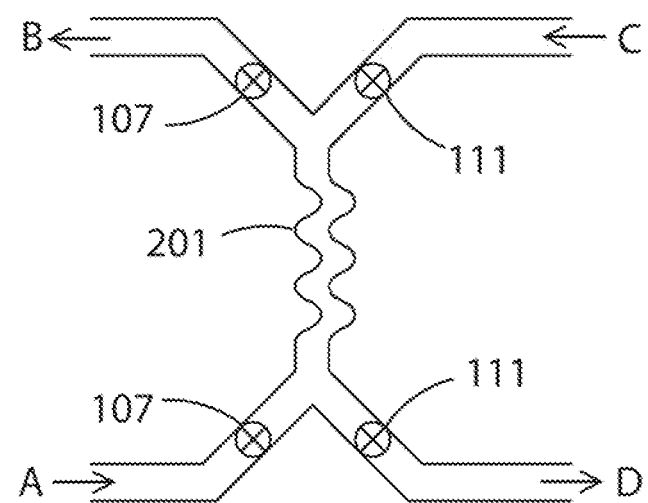
FIG. 2 shows the wye-configured connection of an intermediate-reservoir heat exchanger to primary and secondary loop valves.

FIG. 2 shows the wye-connection of primary and secondary loop valves 107 and 108 to heat exchanger 201. Heat exchanger 201 is representative of any of the multiplicity of intermediate-reservoir heat exchangers. Flow-wise connection A receives primary loop coolant from primary loop pump 106. Flow-wise connection B discharges primary loop coolant to primary loop heat-accepting heat exchangers 108 in temperature-critical reservoir 101. When primary loop valves 107 are open and secondary loop valves 111 are closed, primary loop coolant flows through heat exchanger 201 and it serves as primary loop heat-rejecting heat exchanger 109. Flow-wise connection C receives secondary loop coolant coming from secondary loop pump 110. Flow-wise connection D discharges secondary loop coolant to secondary loop heat-rejecting heat exchanger 113 in heat sink 102. When primary loop valves 107 are closed and secondary loop valves 111 are open, secondary loop coolant flows through heat exchanger 201 and it serves as secondary loop heat-accepting heat exchanger 112. When both primary loop valves 107 and secondary loop valves 111 are closed, heat exchanger 201 is dormant. Each of the intermediate-reservoir heat exchangers represented by heat exchanger 201 can serve at times as the primary loop heat-rejecting heat exchanger 109 and at other times as the secondary loop heat-accepting heat exchanger 112.

The efficiency of the cooling system revealed in this specification is dependent in part on the nature of the interface between the heat sink and the wall of the conduit comprising the secondary loop heat-rejecting heat exchanger. In nearly all cooling operations, the atmosphere serves as the ultimate heat sink for accepting the thermal energy that has been removed from a temperature-critical reservoir during a cooling operation. One possible embodiment of the present system is that the walls of the conduit comprising the secondary loop heat-rejecting heat exchanger are in direct thermal contact with the atmosphere. Thermal energy would then be transferred through the walls of the heat exchanger, passing from the secondary loop coolant to the atmospheric gases outside of the walls of the secondary loop heat-rejecting heat exchanger.

Figure 3:
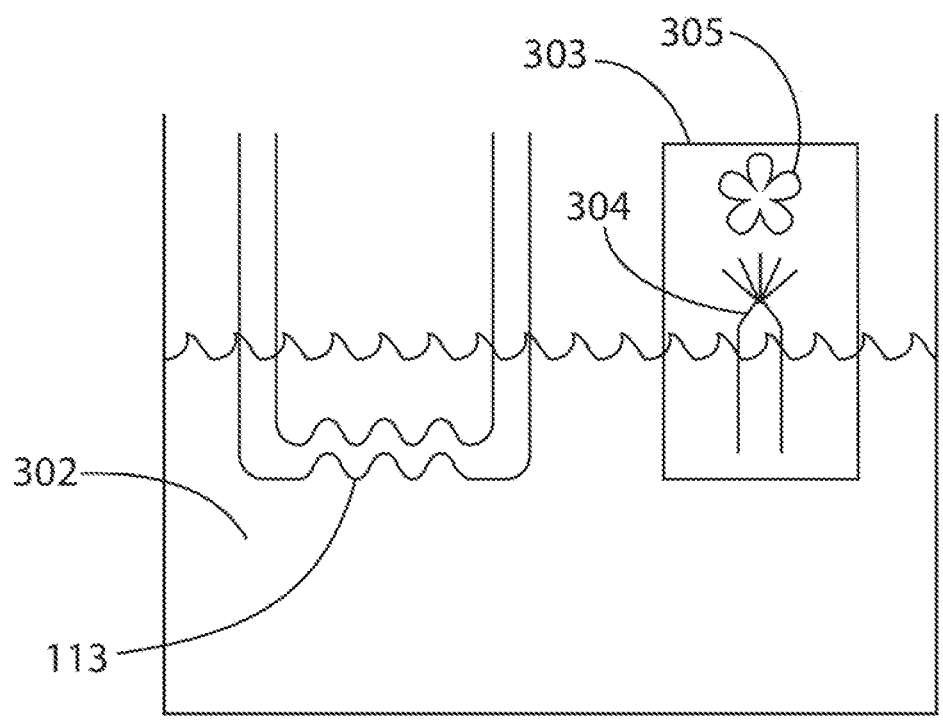
FIG. 3 is a schematic diagram of a heat exchanger comprised of a section of conduit and a surrounding body of liquid cooled by a cooling tower.

FIG. 3 is a diagram of an embodiment of the secondary loop heat-rejecting heat exchanger 113 wherein the conduit comprising the secondary loop heat-rejecting heat exchanger is submerged in a body of liquid 302. The body of liquid 302 is cooled by cooling tower 303 which is shown schematically as a spray nozzle 304 forcing a jet of spray against an airstream driven by fan 305. This is an example of what is referred to as a mechanical-draft cooling tower, which is one of the most common types of cooling tower currently in use. All cooling towers provide cooling for a body of liquid by evaporation of a portion of the liquid they circulate. The latent heat of vaporization of the evaporated liquid cools the remaining liquid to the wet bulb temperature of the atmosphere which is generally several kelvins lower than the actual temperature of the atmosphere. A similar method of cooling the body of liquid would be a fountain, which would again allow for evaporation of liquid to provide cooling of the body of water. It is noted that the atmosphere is still the heat sink and the secondary loop heat-rejecting heat exchanger is comprised of a length of conduit and a body of water.

It is likely that some cooling applications will require that a temperature-critical reservoir be cooled below the lowest temperature which can be achieved by using only the temperature-driven thermal energy transfer processes of the present system. For those applications, the present system could be joined with a conventional vapor-compression heat pump, thereby forming a cooling system which could efficiently cool a temperature-critical reservoir to very low temperatures. In that situation, the primary loop coolant of the present system could be used to cool the condenser of the vapor-compression heat pump. This would significantly decrease the amount of energy consumed by the heat pump's compressor and improve the overall efficiency of the cooling process, while at the same time making lower temperatures available for the temperature-critical reservoir.

What is claimed is:

1. A cooling system disposed so as to transfer thermal energy from a temperature-critical reservoir to a heat sink, with said cooling system comprised of a multiplicity of primary loop valves, a multiplicity of secondary loop valves, and
   a. An intermediate reservoir comprised of a multiplicity of intermediate-reservoir regions; wherein each of said intermediate-reservoir regions is uniquely associated with, and fixed in intimate thermal contact with, an intermediate-reservoir heat exchanger; and wherein each of said intermediate-reservoir heat exchangers has a coolant inlet port and a coolant discharge port; and wherein both the coolant inlet port and the coolant discharge port of each of said intermediate-reservoir heat exchangers are flow-wise connected in a wye configuration to one of said primary loop valves and one of said secondary loop valves, thereby forming a multiplicity of wye-configured flow control assemblies, and
   b. A primary flow loop which provides a thermal link between said temperature-critical reservoir and said intermediate reservoir, with said primary flow loop comprised of
      i. a primary loop pump capable of forcing the flow of primary loop coolant around said primary flow loop, and
      ii. a multiplicity of primary loop heat-accepting heat exchangers; wherein each of said primary loop heat-accepting heat exchangers is uniquely associated with, and fixed in intimate thermal contact with, a region of said temperature-critical reservoir; and wherein each of said primary loop heat-accepting heat exchangers has a coolant inlet port and a coolant discharge port; and wherein the coolant discharge port of each of said primary loop heat-accepting heat exchangers is flow-wise connected in series with one of said primary loop valves, thereby forming a multiplicity of series-configured flow control assemblies; and wherein said series-configured flow control assemblies are flow-wise connected in parallel, and iii. sections of conduit arranged so as to form a closed flow loop by flow-wise connecting said primary loop pump, said series-configured flow control assemblies, and the primary loop valves that are components of said wye-configured flow control assemblies; and c. a secondary flow loop which provides a thermal link between said intermediate reservoir and said heat sink, with said secondary flow loop comprised of
   i. a secondary loop pump capable of forcing the flow of secondary loop coolant around said secondary flow loop; and
   ii. a secondary loop heat-rejecting heat exchanger which is uniquely associated with, and fixed in intimate thermal contact with, said heat sink, and
   iii. sections of conduit arranged so as to form a closed flow loop by flow-wise connecting said secondary loop pump, said secondary loop heat-rejecting heat exchanger, and the secondary loop valves that are components of said wye-configured flow control assemblies, and d. temperature sensors deployed within said temperature-critical reservoir, said intermediate reservoir, said heat sink, said primary flow loop, and said secondary flow loop, and e. a control system which responds to signals received from said temperature sensors by
   i. activating said primary loop pump and operating said primary loop valves so as to accomplish temperature-driven thermal energy transfer from specific regions within said temperature-critical reservoir to specific regions within said intermediate reservoir, and
   ii. activating said secondary loop pump and operating said secondary loop valves so as to accomplish temperature-driven thermal energy transfer from specific regions within said intermediate reservoir to said heat sink.

2. A cooling system as described in claim 1 wherein said intermediate reservoir is comprised of a volume of subterranean earth, with said volume of subterranean earth fixed in intimate thermal contact with a multiplicity of intermediate-reservoir heat exchangers in the form of borehole heat exchangers.

3. A cooling system as described in claim 1 wherein said secondary loop heat-rejecting heat exchanger is disposed so as to transfer thermal energy directly to the atmosphere.

4. A cooling system as described in claim 1 wherein said secondary loop heat-rejecting heat exchanger is disposed so as to transfer thermal energy to a body of liquid which is cooled by a cooling tower.

* * * * *